Nov. 13, 1923.  
J. PHILLIPS  
1,474,286  
HARD RUBBER FLUSH BALL FOR WATER CLOSET TANKS  
Filed Dec. 15, 1921
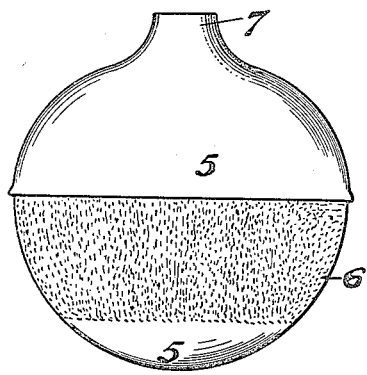
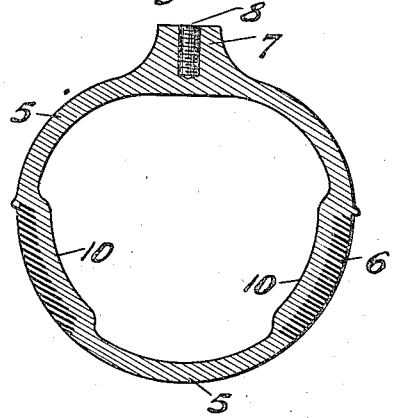
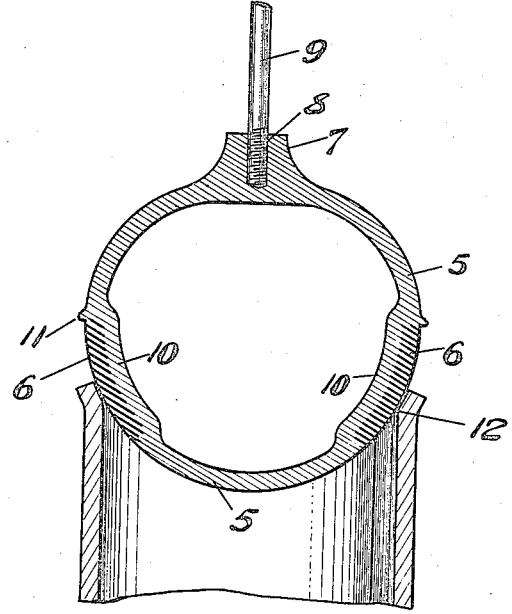
Inventor  
Julius Phillips Patented Nov. 13, 1923.

1,474,286

UNITED STATES PATENT OFFICE.

JULIUS PHILLIPS, OF TRENTON, NEW JERSEY, ASSIGNOR TO THE LUZERNE RUBBER COMPANY, OF TRENTON, NEW JERSEY, A CORPORATION OF NEW JERSEY.

HARD-RUBBER FLUSH BALL FOR WATER-CLOSET TANKS.

Application filed December 15, 1921. Serial No. 522,479.

*To all whom it may concern:*

Be it known that I, JULIUS PHILLIPS, a citizen of the United States, residing at Trenton, in the county of Mercer and State of New Jersey, have invented new and useful Improvements in Hard-Rubber Flush Balls for Water-Closet Tanks, of which the following is a specification.

This invention relates to a hard rubber flush ball for water closet tanks and other purposes, and the primary object of the same is to provide a flush ball constructed wholly of rubber of different degrees of hardness, or one wherein metal is entirely eliminated in the structure and so cured that the ball is an integral mass which has a yielding characteristic at the point of contact with the valve seat, the ball being durable and incapable of losing its shape, and the softer portion so cured relatively to the remaining harder portion that it cannot pull away from the latter or become loose.

With these and other objects and advantages in view, the invention consists in the construction and arrangement which will be more fully hereinafter described and claimed.

In the drawing:

Fig. 1 is a side elevation of a flush ball embodying the features of the invention;

Fig. 2 is a central vertical section through the improved ball;

Fig. 3 is a transverse sectional view of the ball shown applied to a valve seat.

The improved ball comprises a main body 5 having a valve seat engaging portion 6 which is an integral part of the body 5, the latter being practically of ball shape and hollow and formed at the top with a valve stem attaching boss 7. This boss 7 is of suitable dimensions and has a threaded bore 8 for removable application thereto of a valve stem 9, as shown by Fig. 3. The valve seat engaging portion 6 of the body 5 is located below the horizontal central diameter 11 of the said body, the latter being projected inwardly to form a rib 10 to give the ball at the portion thereof which engages the valve seat 12, or where the valve seat engaging portion is located, a greater wall thickness and in order that the valve seat engaging portion 6 may be of as great thickness as possible so as to properly perform its function. In forming the ball, the main body 5 is cured or vulcanized to such an extent as to render the same hard and unimpressionable, whereas the portion 6 is cured soft, the curing of the complete ball with respect to the main hard body and the softer valve engaging portion all being effected at one operation. This structure is materially advantageous relatively to the formation of the portion 6 and the main body 5 of the ball in separate pieces and subsequently securing the portion 6 to the main body of the ball, for the reason that the integrality of the portion 6 with the main body of the ball will result in the production of a yielding bearing or valve engaging surface or portion which will not loosen or in anywise become displaced, particularly in view of the hard backing of the main body 5 over which the softer valve engaging portion 6 is located. The outer surface of the softer valve engaging portion 6 is flush with the outer convex surface of the main body 5 of the ball, and moreover, the softer valve engaging portion 6 has considerable extent, so as to adapt the same to readily fit and positively engage the rim of the valve seat.

The main body 5 of the ball does not have the least yielding movement, and moreover, the valve seat engaging member or portion 6 is of such vertical extent as to always ensure engagement of some portion thereof with the valve seat, and as a consequence, one flush ball embodying the features of the invention and of a given size may accurately register and properly function with valve seats of different diameters. The improved flush ball is comparatively light and exceptionally durable in its service, in view of the fact that there are no metal parts comprised therein, and as a consequence, there is no tendency to corrosion and deterioration. In view of the uniform tautness of the softer valve engaging portion 6 of the ball, there will be no detrimental adherence between said portion 6 and the valve seat during the action of the flush ball in its service as an opening and closing means relatively to said seat, but when the valve is in engagement with the seat and the softer portion 6 bears on the rim of the valve seat, as shown by Fig. 3, there will be no leakage, but on the contrary a very tight jointure will be produced between the said engaging parts. A further advantage of the improved ball is that no adhering substance will be required to be used between the hard main body 5 and the softer portion 6, for the reason that the latter is an integral part of the body and will be retained and positively held at all times in its convex shape for positively engaging a valve seat.

What is claimed as new is:

1. A device of the class specified, consisting of a jointless hard rubber body of substantially spherical form having a soft rubber member integral therewith and circumferentially surrounding said body above the lower portion of the latter.

2. A device of the class specified, consisting of a jointless hollow hard rubber body of substantially spherical form having a lower integral soft rubber member located below the horizontal diameter of the said body, the soft rubber member extending around the body flush with the outer surface of the latter and terminating above the lower portion of the body.

3. A device of the class specified, consisting of a hollow substantially spherical body of hard rubber without joints and a soft rubber portion formed integrally with and circumferentially surrounding said body above the lower harder part of said body to provide a yielding valve seat-engaging component of a width to adapt the device for operation with valve seats of various diameters.

4. A device of the class specified having a body formed of jointless hard rubber and provided on its exterior with an integral softer rubber portion backed by a part of the hard rubber portion of the body, the exposed surface of the softer rubber portion being flush with the surface of said body and forming a valve-seat engaging component.

5. A device of the class specified, comprising a jointless hollow body of hard rubber having an internal rib and a softer rubber portion formed integrally with said body and extending around said body opposite said rib flush with the surface of the body to provide a yielding valve-seat engaging component.

6. A device of the class specified, consisting of a jointless hard rubber hollow ball having a lower soft rubber bearing member integrally formed therewith and circumferentially surrounding a part of the body above the lower portion of the latter.

7. A ball of the class specified of hollow form and composed of hard rubber and an integral softer rubber portion circumferentially surrounding a part of the body of the ball above a lower harder portion of the body to provide a yielding valve seat engaging component.

In testimony whereof I have hereunto set my hand in presence of two subscribing witnesses.

JULIUS PHILLIPS.

Witnesses:
BRUCE BEDFORD,
C. DUDLEY WILSON.